US008823837B2

(12) United States Patent
Kim (10) Patent No.: US 8,823,837 B2
(45) Date of Patent: Sep. 2, 2014

(54) ZOOM CONTROL METHOD AND APPARATUS, AND DIGITAL PHOTOGRAPHING APPARATUS

(75) Inventor: Jong-sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 13/557,664

(22) Filed: Jul. 25, 2012

(65) Prior Publication Data

US 2013/0120617 A1    May 16, 2013

(30) Foreign Application Priority Data

Nov. 14, 2011    (KR) ................. 10-2011-0118515

(51) Int. Cl.
*H04N 5/262*    (2006.01)
*G09G 5/00*    (2006.01)

(52) U.S. Cl.
USPC ............. 348/240.2; 348/240.99; 348/88

(58) Field of Classification Search
USPC .......... 348/240.99–240.3, 333.06–333.07
See application file for complete search history.

(56) References Cited

U.S. PATENT DOCUMENTS

| | | | |
|---|---|---|---|
| 7,885,537 B1* | 2/2011 | Kuss | 396/374 |
| 8,144,235 B2 | 3/2012 | Mori | |
| 2007/0242143 A1* | 10/2007 | Sugimoto | 348/240.2 |
| 2007/0285534 A1* | 12/2007 | Makioka | 348/240.99 |
| 2008/0117307 A1* | 5/2008 | Sato | 348/222.1 |
| 2008/0246852 A1* | 10/2008 | Mori | 348/222.1 |
| 2009/0103778 A1 | 4/2009 | Yoshizumi et al. | |
| 2009/0141147 A1 | 6/2009 | Alberts et al. | |
| 2010/0157105 A1* | 6/2010 | Yokohata | 348/240.3 |
| 2010/0272328 A1 | 10/2010 | Lee | |
| 2011/0043662 A1* | 2/2011 | Kim | 348/240.2 |
| 2011/0157385 A1 | 6/2011 | Hoshino et al. | |
| 2011/0216225 A1 | 9/2011 | Yoshizumi | |
| 2011/0267499 A1* | 11/2011 | Wan et al. | 348/231.99 |
| 2011/0267503 A1* | 11/2011 | Kunishige et al. | 348/240.1 |

FOREIGN PATENT DOCUMENTS

| | | |
|---|---|---|
| JP | 2011-109693 A | 6/2011 |
| JP | 2011-188065 A | 9/2011 |
| JP | 2011-223174 A | 11/2011 |
| KR | 10-2011-0074718 A | 7/2011 |

OTHER PUBLICATIONS

PCT Search Report established for PCT/KR 2012/006963 (Feb. 25, 2013).

* cited by examiner

*Primary Examiner* — Twyler Haskins
*Assistant Examiner* — Dwight C Tejano
(74) *Attorney, Agent, or Firm* — Drinker Biddle & Reath LLP (57) ABSTRACT

A zoom control method and apparatus. The zoom control method allows a subject to be photographed by automatically performing a zooming operation with a proper composition and resolves a problem where a subject disappears from a screen due to the zooming operation.

19 Claims, 9 Drawing Sheets

ZOOM CONTROL METHOD AND APPARATUS, AND DIGITAL PHOTOGRAPHING APPARATUS

CROSS-REFERENCE TO RELATED PATENT APPLICATION

This application claims the benefit of Korean Patent Application No. 10-2011-0118515, filed on Nov. 14, 2011, in the Korean Intellectual Property Office, the disclosure of which is incorporated herein in its entirety by reference.

BACKGROUND

1. Field of the Invention

Embodiments relate to a method and apparatus for controlling a zooming operation and a digital photographing apparatus.

2. Description of the Related Art

Most digital cameras that have been recently released have a more than 10× optical zoom function. An optical zoom function can refer to a function to adjust a focus distance so that a subject may become in focus according to its size. The optical zoom function may arbitrarily determine a change of a viewing angle from standard to telephoto and from wide-angle to standard. Compared to a short focus lens, a zoom lens is preferred by users because the zoom lens has various viewing angles, provides a sense of perspective to an image, and may be used to photograph a faraway subject in a large size image without affecting the picture quality.

Meanwhile, unlike an optical zoom function, a digital zoom function is used to enlarge an image through image processing, apart from using a lens. The digital zoom function is used to enlarge and display a part of a captured image, that is, the digital zoom function is reproducing zoom function, in a reproducing mode of a camera. Thus, the digital zoom function may be effectively used when detailedly monitoring a captured image by the camera.

SUMMARY OF THE INVENTION

Embodiments can provide a zoom control method and apparatus that allow a subject to be photographed by automatically performing a zooming operation with a proper composition and that resolve a problem where a subject disappears from a screen due to the zooming operation.

According to an aspect, there can be provided a zoom control method that includes: displaying an input image on a display unit, displaying on the display unit a subject detecting frame that shows at least a part of a subject included in the input image, and performing a zooming operation on the input image according to a predetermined zoom magnification, wherein the subject detecting frame is not positioned in a middle of the input image, and a position of the subject detecting frame after performing the zooming operation is substantially the same as that of a prior position of the subject detecting frame before performing the zooming operation.

The zoom magnification may be determined in such a way that the subject detecting frame does not overlap with at least one of a left boundary, a right boundary, an upper boundary, and a lower boundary of the input image after performing the zooming operation.

A ratio of a first distance between the subject detecting frame and a left boundary of the input image to a second distance between the subject detecting frame and a right boundary of the input image before the zooming operation is performed may be substantially the same as that after the zooming operation is performed.

A ratio of a distance between the subject detecting frame and the upper boundary of the input image to a distance between the subject detecting frame and the lower boundary of the input image before the zooming operation is performed may be substantially the same as that after the zooming operation is performed.

When a plurality of subject detecting frames exist, the zoom magnification may be determined based on the plurality of subject detecting frames and the input image.

The zoom magnification may be determined in such a way that the plurality of subject detecting frames do not overlap with at least one of a left boundary, a right boundary, an upper boundary, and a lower boundary of the input image after performing the zooming operation.

The zoom magnification may be determined as a smaller zoom magnification from among a first zoom magnification at which the subject detecting frame does not overlap with at least one of a left boundary, a right boundary, an upper boundary, and a lower boundary of the input image after performing the zooming operation and a second zoom magnification that is determined based on a ratio at which the subject detecting frame occupies the input image.

The display unit may be configured to face the subject.

The display unit may be configured as a flip type display unit so as to face the subject.

The zoom control method may further include transmitting the input image and the subject detecting frame to an external mobile device capable of displaying the input image and the subject detecting frame.

The subject may be a face, an animal, or an object.

According to another aspect, there can be provided a zoom control method that includes: detecting a subject from an input image, calculating a zoom magnification based on a detecting frame that detects the subject and a zoomable area of the input image, and performing a zooming operation according to the calculated zoom magnification, wherein the detecting frame is positioned within the zoomable area even after performing the zooming operation.

A composition of the input image may be maintained even after performing the zooming operation.

The calculating of the zoom magnification may include calculating a coordinate of the detecting frame at a zoom magnification, at which a coordinate of at least one of a leftmost boundary, a rightmost boundary, an uppermost boundary, and a lowermost boundary of the zoomable area is enlarged.

When a plurality of subjects are detected from the input image, the calculating of the zoom magnification may include calculating a coordinate of each detecting frame that detects each of the plurality of subjects at a zoom magnification at which a coordinate of at least one of a leftmost boundary, a rightmost boundary, an uppermost boundary, and a lowermost boundary of the zoomable area is enlarged.

The calculating of the zoom magnification may include calculating the zoom magnification based on a ratio of a size of the detecting frame to a size of the zoomable area.

The zoomable area may be an entire area of a display screen for displaying the input image.

According to another aspect of the present invention, there is provided a zoom control apparatus that includes a display unit that displays an input image and a subject detecting frame which shows at least a part of a subject included in the input image, and a controller that performs a zooming operation with respect to the input image according to a predetermined zoom magnification, wherein the subject detecting frame is not positioned in a middle of the input image, and a position of the subject detecting frame after performing the zooming operation is substantially the same as that of a prior position of the subject detecting frame before performing the zooming operation.

The controller may determine the zoom magnification in such a way that the subject detecting frame does not overlap with at least one of a left boundary, a right boundary, an upper boundary, and a lower boundary of the input image after performing the zooming operation.

A ratio of a first distance between the subject detecting frame and a left boundary of the input image to a second distance between the subject detecting frame and a right boundary of the input image before the zooming operation is performed may be substantially the same as that after the zooming operation is performed.

A ratio of a first distance between the subject detecting frame and an upper boundary of the input image to a second distance between the subject detecting frame and a lower boundary of the input image before the zooming operation is performed may be substantially the same as that after the zooming operation is performed.

When a plurality of the subject detecting frames exist, the controller may determine the zoom magnification based on the plurality of subject detecting frames and the input image.

The controller may determine the zoom magnification in such a way that the plurality of subject detecting frames do not overlap with at least one of a left boundary, a right boundary, an upper boundary, and a lower boundary of the input image after performing the zooming operation.

According to another aspect, there can be provided a digital photographing apparatus that includes a photographing device that generates an input image by receiving light from a subject to be photographed, a zoom lens that enlarges or reduces the input image according to a predetermined zoom magnification, a display screen that displays the input image and a subject detecting frame which shows at least a part of the subject included in the input image, and a digital signal processor (DSP) that controls the zoom lens according to the zoom magnification, wherein the DSP controls the zoom lens in such a way that a position of the subject detecting frame before controlling the zoom lens is substantially the same as a prior position of the subject detecting frame after controlling the zoom lens.

The display screen may be configured to face the subject.

The display screen may be a flip type display unit so as to face the subject.

The digital photographing apparatus may further include a communication unit that transmits the input image and the subject detecting frame to an external mobile device configured to display the input image and the subject detecting frame.

BRIEF DESCRIPTION OF THE DRAWINGS

The above and other features and advantages will become more apparent by describing in detail exemplary embodiments thereof with reference to the attached drawings in which:

FIGS. 5A to 6B are views for describing a zoom control method according to a related art;

FIGS. 7A to 8B are views for describing a zoom control method according to other embodiments;

FIGS. 10A to 12B are views for describing a zoom control method according to other embodiments.

DETAILED DESCRIPTION

Embodiments are described in detail with reference to the accompanying drawings. However, embodiments are not limited thereto and it will be understood that various changes in form and details may be made therein without departing from the spirit and scope of the following claims. That is, descriptions on particular structures or functions may be presented merely for explaining exemplary embodiments. In the following description, when detailed descriptions about related well-known functions or structures are determined to make the gist of the present invention unclear, the detailed descriptions will be omitted herein.

Terms such as "first" and "second" are used herein merely to describe a variety of constituent elements, but the constituent elements are not limited by the terms. Such terms are used only for the purpose of distinguishing one constituent element from another constituent element.

The terms used in the present specification are used for explaining a specific exemplary embodiment, and do not limit the prevent invention. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Hereinafter, embodiments will be described in detail by explaining exemplary embodiments with reference to the attached drawings. Like reference numerals in the drawings denote like elements. A redundant description of like elements will be omitted herein. Expressions such as "at least one of," when preceding a list of elements, modify the entire list of elements and do not modify the individual elements of the list.

Figure 1:
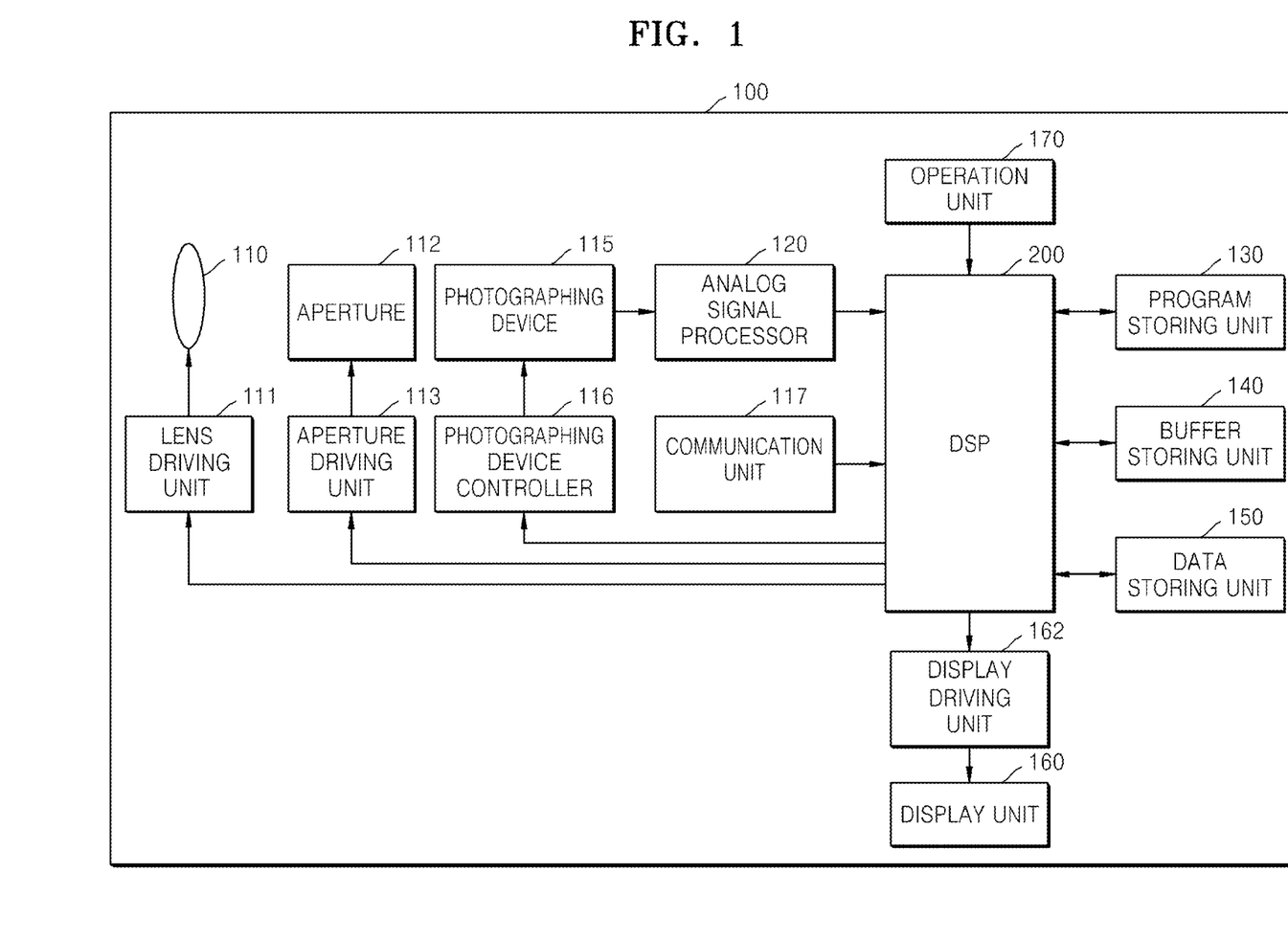
FIG. 1 is a schematic block diagram showing a digital camera as an example of a digital photographing apparatus, according to an embodiment.

FIG. 1 schematically illustrates a structure of a digital camera 100 as an example of a digital photographing apparatus according to an embodiment.

The digital camera 100 is described below as an example of a digital photographing apparatus according to an embodiment. However, the digital photographing apparatus is not limited to the digital camera 100 of FIG. 1 and may be any type of a digital apparatus such as a camera phone, a personal digital assistant (PDA), a portable multimedia player (PMP), or a camcorder.

The digital camera 100 according to the present embodiment may include a lens unit 110, a lens driving unit 111, an aperture 112, an aperture driving unit 113, a photographing device 115, a photographing device controller 116, an analog signal processor 120, a program storing unit 130, a buffer storing unit 140, a data storing unit 150, a display driving unit 162, a display unit 160, a digital signal processor (DSP) 200, and an operation unit 170. The lens unit 110, the lens driving unit 111, the aperture 112, the aperture driving unit 113, the photographing device 115, the photographing device controller 116, and the analog signal processor 120 may be referred to a photographing unit.

The lens unit 110 can focus an optical signal. The lens unit 110 can include a zoom lens for controlling a viewing angle to be increased or decreased according to a focal length and a focus lens for adjusting a focus of an object. The zoom lens and the focus lens each may be formed of a single lens or a group of a plurality of lenses. The aperture 112 can adjust an amount of incident light according to an opening degree thereof. The zoom lens may be formed of a plurality of lens groups that have positive and negative refractive powers. For example, the zoom lens may be formed of a first lens group having a positive refractive power, a second lens group having a negative refractive power, a third lens group having a positive refractive power, and a fourth lens group having a positive/negative refractive index that are sequentially disposed from an object. Accordingly, the zoom lens may change a viewing angle by adjusting a position of each lens group under the drive control of the lens driving unit 111. That is, the lens driving unit 111 may move the zoom lens from a wide-angle end to a telephoto end to perform a zoom-in operation or from a telephoto end to a wide-angle end to perform a zoom-out operation.

The lens driving unit 111 and the aperture driving unit 113 can receive a control signal from the DSP 200 and respectively can drive the lens unit 110 and the aperture 112. The lens driving unit 111 can adjust the focal length by controlling a position of a lens to perform operations of auto-focusing, zoom change, and focus change. The aperture driving unit 113 can adjust the opening degree of the aperture 112, in particular, can adjust an f number or a value of the aperture 112 to perform auto-focusing, auto-exposure correction, focus change, and adjustment of depth of field.

An optical signal passing through the lens unit 110 can form an image of a subject on a light receiving surface of the photographing device 115. The photographing device 115 may include a charge coupled device (CCD), a complementary metal oxide semiconductor image sensor (CIS), or a high speed image sensor for converting an optical signal to an electric signal. A sensitivity of the photographing device 115 may be adjusted by the photographing device controller 116. The photographing device controller 116 may control the photographing device 115 according to a control signal that can be automatically generated by an image signal that is inputted in real time or a control signal that is manually inputted by an operation of a user. An exposure time of the photographing device 115 can be adjusted by a shutter (not shown). The shutter can be a mechanical shutter for adjusting incidence of light by moving a blind or an electronic shutter for controlling exposure by applying an electric signal to the photographing device 115.

A communication unit 117 can transmit an input image or a live view image to another external mobile device, for example, a smart phone or a portable terminal, under the control of the DSP 200 to allow the external mobile device to display other photographing conditions including the input image that are to be displayed on the digital camera 100. The communication unit 117 can communicate with the external mobile device according to a predetermined wireless Internet protocol, for example, wireless fidelity (Wi-Fi)

The analog signal processor 120 can perform noise reduction processing, gain control, waveform shaping, and analog-digital conversion processing on an analog signal applied by the photographing device 115.

The operation unit 170 can be used to input an external control signal, for example, by a user. The operation unit 170 may include a shutter-release button for inputting a shutter-release signal for capturing an image by exposing the photographing device 115 to light for a predetermined period of time, a power button for inputting a control signal for controlling on/off of power, a wide zoom button and a tele-zoom button for increasing or decreasing a viewing angle according to an input, and a variety of function buttons for selecting a mode such as a text input mode, a photographing mode, a reproduction mode, a white balance setting mode, or an exposure setting mode. The operation unit 170 may have a variety of types of buttons as presented above, but embodiments are not limited thereto. For example, the operation unit 170 may be a keyboard, a touch pad, a touch screen, or a remote controller to be used by a user to input data.

The digital camera 100 can include a program storing unit 130 for storing a program such as an operation system for driving the digital camera 100 or an application system, a buffer storing unit 140 for temporarily storing data needed for performing an operation or resultant data, and a data storing unit 150 for storing various information needed for the program, such as an image file having an image signal.

The digital camera 100 can include the display unit 160 for displaying an operation state of the digital camera, still image data, or moving picture data captured by the digital camera 100. The display unit 160 may provide visual information and acoustic information to a user. To provide visual information, the display unit 160 may include, for example, a liquid crystal display panel (LCD) or an organic light emitting display panel (OLED). The display driving unit 162 can provide a driving signal to the display unit 160. The display unit 160 according to one or more embodiments can be disposed in a position facing a subject to be photographed. For example, the display unit 160 may be disposed on a front surface of the digital camera 100, that is, a surface on which a lens is disposed. In another example, the display unit 160 may be disposed on a rear surface of the digital camera 100 and may be flipped upward over the digital camera 100 so that the display unit 160 moves to the front surface of the digital camera 100 and faces the subject to be photographed.

The digital camera 100 can include the DSP 200, which can process input image signals and can control each element according to a processed input image signal or an external input signal. The DSP 200 may reduce noise of input image data and can perform image signal processing for improving image quality, such as gamma correction, color filter array interpolation, color matrix, color correction, or color enhancement. Also, the DSP 200 may generate an image file by compressing image data generated by performing the image signal processing for improving image quality or may restore image data from an image file. An image compression format may have a reversible format or irreversible format. Compressed data may be stored in the data storing unit 150. Also, the DSP 200 may functionally perform sharpness processing, color processing, blur processing, edge emphasis processing, image interpretation processing, image recognition processing, or image effect processing. Face recognition or scene recognition processing may be performed as image recognition processing. For example, luminance level control, color correction, contrast control, contour emphasis control, screen division processing, or character image generation and synthesis processing may also be performed.

Also, the DSP 200 may generate a control signal to control auto-focusing, zoom change, focus change, or auto-exposure correction by executing a program stored in the program storing unit 130 or using a separate module and may provide a generated control signal to the lens driving unit 111, the aperture driving unit 113, and the photographing device controller 116, so that operations of elements, such as a shutter or a flash, provided in the digital camera 100 may be generally controlled.

Figure 5A:
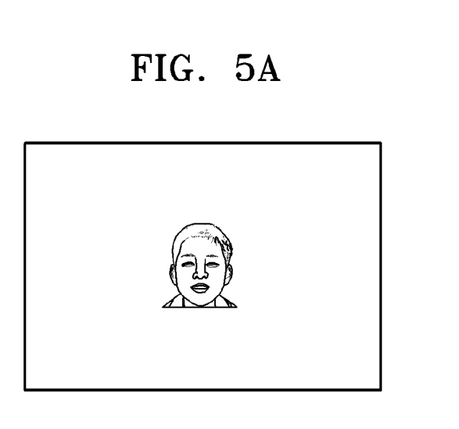
Figure 5B:
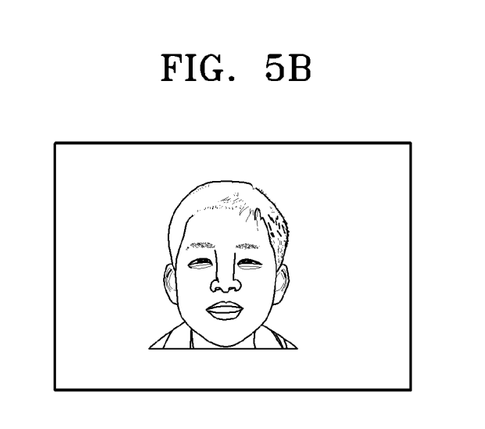
Figure 6A:
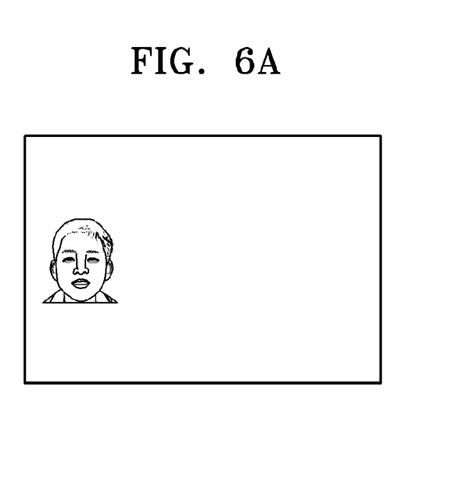
Figure 6B:
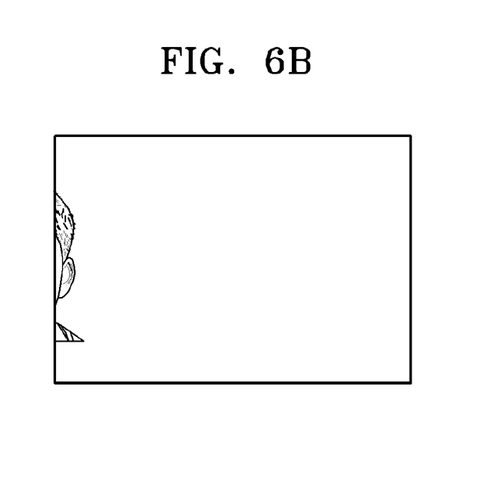

In a conventional digital camera, when performing a zooming operation including a zoom-in operation or a zoom-out operation, a face of a subject can be detected or a distance between the digital camera and the subject can be detected. Then, the zoom-in operation can be performed until the face reaches a proper size. Referring to FIG. 5A, in a live view image or a preview image, a face of a subject positioned in the middle of a screen can be detected. Referring to FIG. 5B, an image can be zoomed-in at a proper zoom magnification or enlarged with respect to the detected face. However, in the conventional digital camera, when a subject is not positioned in the middle of a screen as shown in FIG. 6A, a face of the subject may disappear from the screen when zooming-in the detected face as shown in FIG. 6B. In particular, when a size of the detected face is small and if the detected face is enlarged to have a proper size, a possibility that the face of the subject disappears from the screen can be further increased. Accordingly, a zooming operation can become unstable, and the face of the subject may not be normally captured.

In the digital camera 100 according to one or more embodiments, even if a subject to be photographed is not positioned in the middle of a screen, photographing may be performed by performing a zoom-in operation or a zoom-out operation to change a face size into a proper size without affecting the subject to be photographed, for example, a part of the face of the subject. Also, the digital camera 100 according to one or more embodiments may allow a user to check a degree at which a subject to be photographed, for example, a face of the subject, is enlarged or reduced using a front surface display unit or a flip-shaped display unit.

Figure 2:
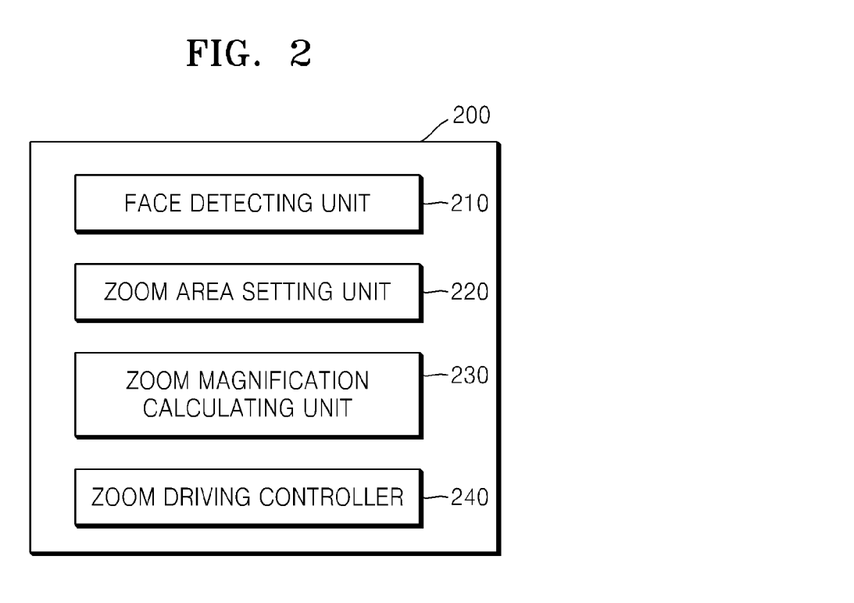
FIG. 2 is a schematic block diagram showing a digital signal processing unit shown in FIG. 1.

FIG. 2 is a schematic block diagram of the DSP 200 shown in FIG. 1.

Referring to FIG. 2, the DSP 200 can include a face detecting unit 210, a zoom area setting unit 220, a zoom magnification calculating unit 230, and a zoom driving controller 240. The DSP 200 should be understood as having the same meaning as a control unit described in the claims.

In the DSP 200 according to the present invention, the display driving unit 162 can display an input image and a subject detecting frame showing at least a part of a subject included in the input image. The input image may be a live view image or a preview image before photographing the subject. The DSP 200 can control a zooming operation to be performed with respect to the input image according to a predetermined zoom magnification. The zooming operation may be automatically performed according to performance of a predetermined auto-zoom mode. The subject detecting frame may be a face detecting frame for detecting a part of a specific subject, for example, an area of a human's face. Even after a zooming operation is performed on the input image, for example, the input image is enlarged through a zoom-in operation, the DSP 200 can maintain a position of the subject detecting frame in the input image to be substantially the same as a position of the subject detecting frame before forming the zooming operation on the input image. This means that a ratio of a distance between the subject detecting frame and a left boundary of the input image to a distance between the subject detecting frame and the right boundary of the input image can be maintained constant before and after the input image is enlarged or that a ratio of a distance between the subject detecting frame and an upper boundary of the input image to a distance between the subject detecting frame and the lower boundary of the input image can be maintained constant before and after the input image is enlarged. Also, from the aspect of a magnification of an image, being substantially the same means that magnifications of the subject before and after being enlarged can be maintained constant.

Figure 7A:
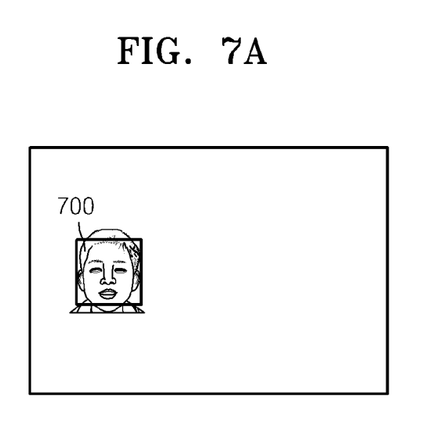
Figure 7B:
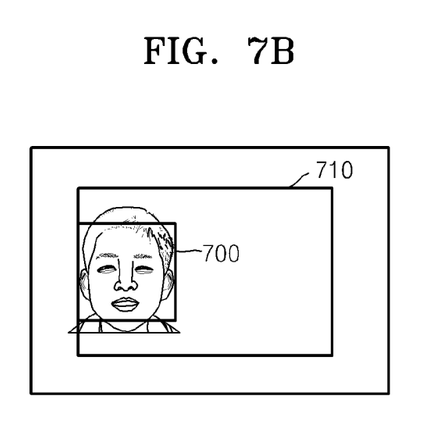

Referring to FIG. 7A, the DSP 200 can display the input image and a subject detecting frame 700 for detecting a part of a subject in the input image, for example, a face area. Referring to FIG. 7B, the DSP 200 can enlarge the input image so that even after the input image is enlarged at a proper zoom magnification, a position of the subject detecting frame 700 can be maintained similar to a position of the subject detecting frame 700 before the input image is enlarged. In particular, in FIG. 7B, reference numeral 710 denotes a boundary of a zoomable area. The DSP 200 can determine a zoom magnification so as to not be beyond the boundary of the zoomable area 710 in determining a zoom magnification for enlarging the input image. In FIG. 7B, the zoomable area 710 can be smaller than an entire boundary line of the input image, but this is just an example. That is, the zoomable area 710 may also be smaller than an entire area of the input image or the zoomable area 710 may be smaller than the zoomable area 710 shown in FIG. 7B.

Figure 8A:
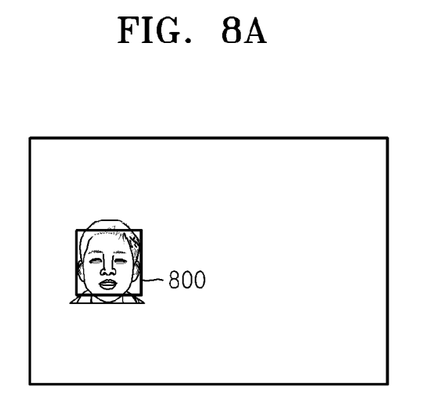
Figure 8B:
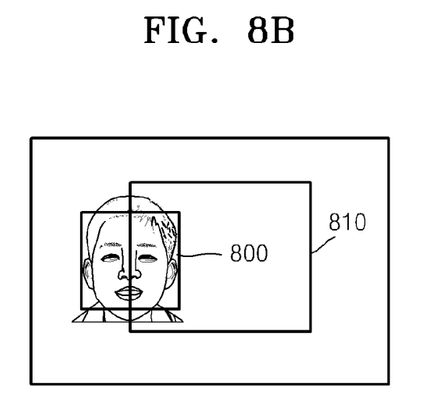

Referring to FIG. 8A, the DSP 200 can detect a face area of a subject in an input image and can enlarge the face area to a proper size without considering a zoomable area 810 as shown in FIG. 8B. In this case, the face area may deviate from the zoomable area 810 shown in FIG. 8B.

Referring back to FIG. 2, the face detecting unit 210 can detect a predetermined face area from an input image. When a face is detected, a face detecting frame can be displayed on the face area. Although detecting of a face has been described here, a specific area of the face may also be detected. In general, in the detecting of a face, data regarding features of a previously remembered face can be compared with data regarding an input image, and then it can be determined whether the input image includes image data regarding a face. If it is determined that the input image includes the image data regarding a face, it can be determined where the image data regarding a face is in the input image. Widely known face area detecting methods and algorithms can be used in a face detecting method according to one or more embodiments. For example, a face area may be detected using a motion vector technique, a feature detecting technique, an adaboost learning technique, or the like.

The zoom area setting unit 220 can set the zoomable areas 710 and 810 as shown in FIGS. 7B and 8B. The zoomable areas 710 and 810 may be set to correspond to an area equal to, less than, or more than 80% of a display screen or an entire input image, or may be set to correspond to the entire display screen or the entire input image. Also, when a zoom-out operation is performed or the input image is downsized, the zoomable areas 710 and 810 may be set to correspond to an area equal to or less than 50% of the display screen. Left, right, upper, and lower boundaries of the zoomable areas 710 and 810 that are set by the zoom area setting unit 220 may be used as criteria in determining a zoom magnification.

The zoom magnification calculating unit 230 can calculate a zoom magnification based on a subject detecting frame or a face detecting frame and a zoomable area that is set by the zoom area setting unit 220. The zoom magnification calculating unit 230 can calculate a zoom magnification that satisfies a first condition for enlarging a face area to a proper size and a second condition for allowing the subject detecting frame to be positioned within the zoomable area even after performing a zooming operation. A zoom magnification satisfying the first condition can be calculated as follows.

A zoom arrangement can be defined by Zoom Step=[Z1, Z2, ..., Zn], and a zoom step can be enlarged as follows, Z1, Z2, Z3, ..., Zn. A magnification between a current zoom step and a moving zoom step can be calculated by the following formula 1.

$$SR=(\text{Moving Zoom Step})/(\text{Current Zoom Step}) \quad (1)$$

For example, if the moving zoom step is 235 and the current zoom step is 47, a formula 235/47=5 is obtained by the formula 1. That is, the magnification is increased five times.

In order to perform a zoom-in operation so as not to destroy a face area, a junction between the zoomable area 710 and the subject detecting frame 700 can be calculated as shown in FIG. 7B. In this regard, a zoom maximum enlargement magnification size can be calculated as Zx.

A zoom magnification satisfying the second condition can be calculated as follows.

As shown in FIG. 8B, when a zoom-in operation is performed to enlarge a face area to a proper size, a zoom enlargement magnification size can be calculated as Zy. In this regard, a magnification between a size of a current face detecting frame and a predetermined face size can be calculated as Zy.

In order to satisfy both the first and second conditions, a minimum enlargement magnification size, from among the calculated Zx and Zy, can be calculated by the following formula 2.

$$\min(Zx, Zy)=SR \quad (2)$$

Accordingly, according to the zoom magnification calculating method of one or more embodiments, a face area should not disappear and may be automatically enlarged to a proper size. In this regard, although a case of enlarging an input image has been mainly described, the description may also be applied to a case of reducing an input image.

Figure 3:
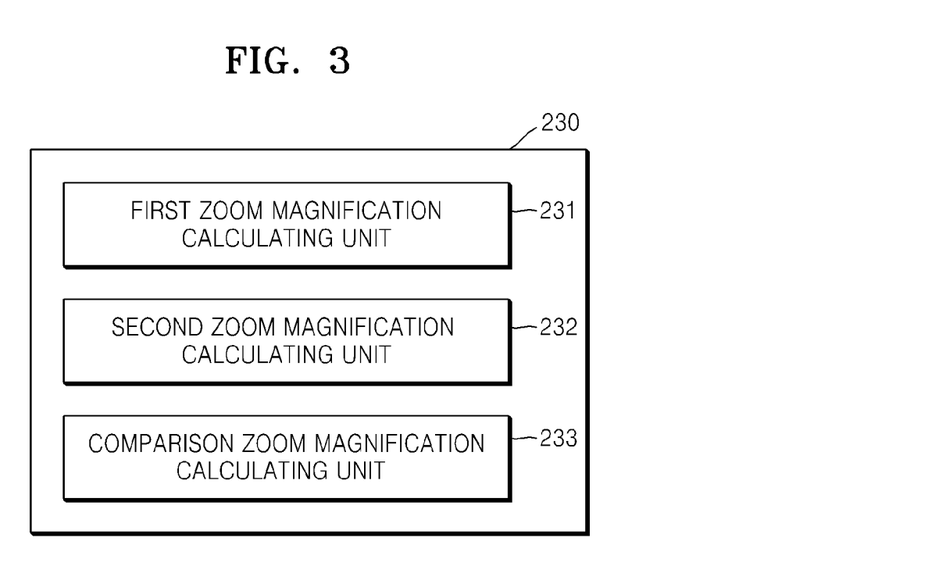
FIG. 3 is a schematic block diagram showing a zoom magnification calculating unit shown in FIG. 2.

The zoom magnification calculating method will be described in detail with reference to FIG. 3. Referring to FIG. 3, the zoom magnification calculating unit 230 can include a first zoom magnification calculating unit 231, a second zoom magnification calculating unit 232, and a comparison zoom magnification calculating unit 233.

The first zoom magnification calculating unit 231 can calculate a zoom magnification at which a subject detecting frame is to be positioned within a zoomable area even after performing a zooming operation. That is, the first zoom magnification calculating unit 231 can calculate a zoom magnification that allows a position of the subject detecting frame to be beyond the leftmost, rightmost, uppermost, and lowermost boundaries of the zoomable area.

The second zoom magnification calculating unit 232 can calculate a zoom magnification to enlarge or reduce a face area to a predetermined subject detecting frame size or a predetermined face size, based on a size of the subject detecting frame or a detected face size. In this regard, the predetermined subject detecting frame size or the predetermined face size may be set to correspond to several percentages of an entire screen or to have a predetermined number of pixels.

The comparison zoom magnification calculating unit 233 can select a smaller zoom magnification from among the zoom magnification calculated by the first zoom magnification calculating unit 231 and the zoom magnification calculated by the second zoom magnification calculating unit 232. Accordingly, according to the zoom control method of one or more embodiments, a zoom magnification may be determined to be a degree at which a subject is adjusted to a proper size and the subject does not disappear from a screen even after performing a zooming operation, that is, a zoom-in operation. In the embodiment described with reference to FIG. 3, a zoom magnification calculating method may be a first zoom magnification calculating method, a second zoom magnification calculating method, and a comparison zoom magnification calculating method, but embodiments are not limited thereto. That is, the zoom magnification calculating method may also be performed by the DSP 200 or the zoom magnification calculating unit 230 shown in FIG. 2. Calculating of a zoom magnification will be described with reference to FIG. 9 and Table 1. In this regard, a subject can be limited to a face, and a zoomable area can be limited to an entire size of an input image or a size of a display screen.

TABLE 1

| Variable | Full Name | Description |
|---|---|---|
| CZS | Current Zoom Step | Current zoom step |
| MZS | Moving Zoom Step | Moving zoom step |
| CFW | Current Face Width | Detected face size (width) |
| DFW | Desired Face Width | Desired face size (width) |
| LW | LCD Width | Width of image buffer |
| LH | LCD Height | Height of image buffer |
| SR | Size Ratio | Enlargement/downsizing ratio of image |
| SRL | Size Ratio of Left | Maximum magnification at which a leftmost coordinate value in a detected face does not disappear from a screen even after performing a zoom operation |
| SRR | Size Ratio of Right | Maximum magnification at which a rightmost coordinate value in a detected face does not disappear from a screen even after performing a zoom operation |
| SRT | Size Ratio of Top | Maximum magnification at which an uppermost coordinate value in a detected face does not disappear from a screen even after performing a zoom operation |
| SRB | Size Ratio of Bottom | Maximum magnification at which a lowermost coordinate value in a detected face does not disappear from a screen even after performing a zoom operation |

First, a zoom magnification in the case of enlarging a face area to a proper face size can be calculated by using the following formula 3.

$$SR=DFW/CFW \quad (3)$$

Next, when a face is enlarged by performing a zooming operation, a maximum zoom magnification at which a face area does not disappear can be calculated. In this regard, as shown in Table 1, SRL can denote a maximum magnification at which a leftmost coordinate value in a detected face does not disappear from a screen even after performing a zoom operation, SRR can denote a maximum magnification at which a rightmost coordinate value in a detected face does not disappear from a screen even after performing a zoom operation, SRT can denote a maximum magnification at which an uppermost coordinate value in a detected face does not disappear from a screen even after performing a zoom operation, and SRB can denote a maximum magnification at which a lowermost coordinate value in a detected face does not disappear from a screen even after performing a zoom operation. The SRL, the SRR, the SRT, and the SRB can be calculated by formulas 4 to 7, respectively.

Figure 9A:
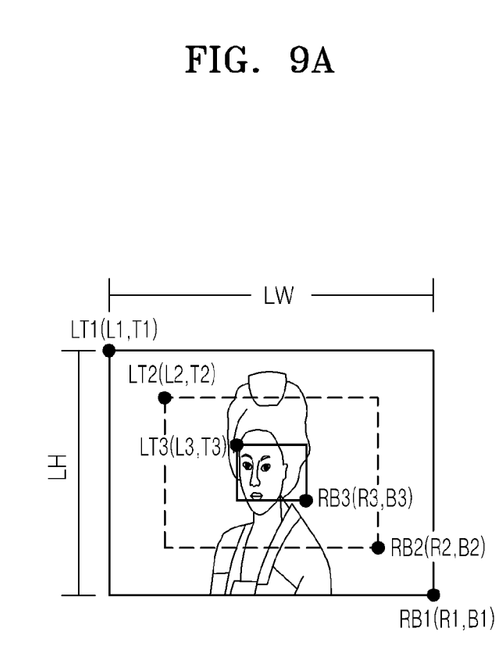
FIGS. 9A and 9B are views for describing a zoom magnification calculating method, according to another embodiment.
Figure 9B:
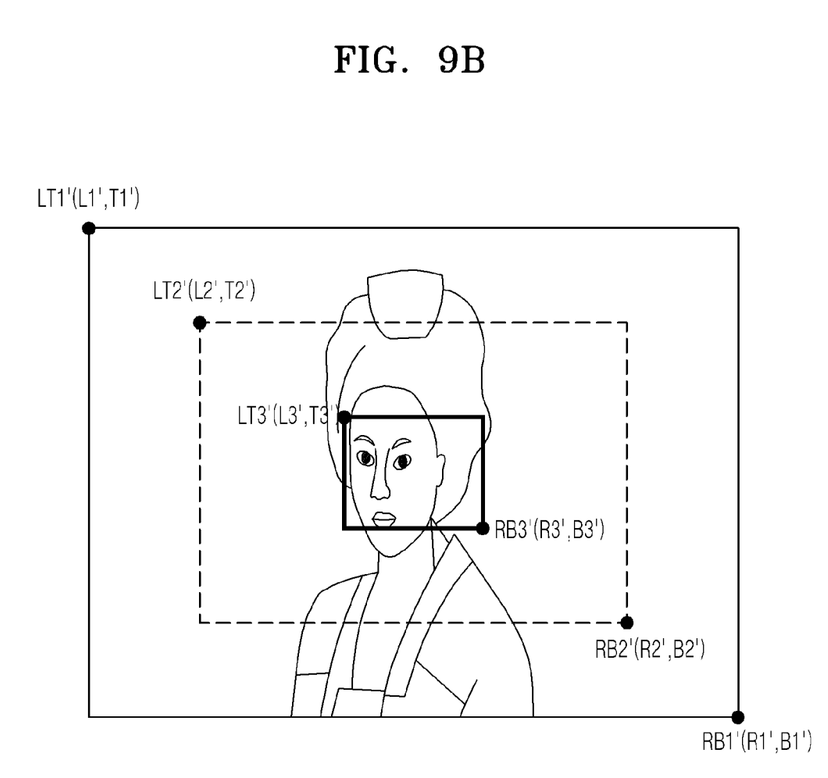

In FIG. 9B, L1', T1', L2', T2', L3', T3', R1', B1', R2', B2', R3', and B3' can denote enlarged coordinate values.

$$L2'=(LW*(SRL-1))/2$$

$$L3'=L3*SRL$$

$$SRL \leq LW/(LW-(2*L3)) \text{ that satisfies } L2'<L3' \quad (4)$$

$$R2'=(LW*(SRR-1))/2$$

$$R3'=R3*SRR$$

$$SRR \leq LW/((2*R3)-LW) \text{ that satisfies } R2'<R3' \quad (5)$$

$$T2'=(LH*(SRT-1))/2$$

$$T3'=T3*SRT$$

$$SRT \leq LH/(LH-(2*T3)) \text{ that satisfies } T2'<T3' \quad (6)$$

$$B2'=(LH*(SRB+1))/2$$

$$B3'=B3*SRB$$

$$SRB \leq LH/((2*B3)-LH) \text{ that satisfies } B2'>R3' \quad (7)$$

Through formulas 4 to 7, the respective zoom magnifications, that is, values of the SR, the SRL, the SRR, the SRT, and the SRB, can be calculated, and of these values, a minimum value can be an actually moving zoom magnification, that is, a moving zoom magnification. Accordingly, a final zoom magnification can be determined by formula 8 below.

$$\text{Zoom Ratio}=\text{Min}(SR, SRL, SRR, SRT, SRB) \quad (8)$$

According to the determination of the zoom magnification, photographing of a person is possible by automatically performing a zooming operation so that an image has a proper composition. Also, when a zoom-in operation is performed on a small face of a person, a problem that an image of the person disappears from a screen due to the zoom-in operation may be resolved.

According to another embodiment, when many people are photographed, faces of the people can be detected, and an image of each person can have a face detecting frame and a display screen size. Also, a zoom magnification can be calculated with respect to each face detecting frame by formulas 3 to 8 above. Accordingly, even when many people are photographed, a zoom operation may be performed at a magnification at which faces of all the people do not disappear from a screen.

The zoom driving controller 240 can output a zoom driving control signal according to a zoom magnification calculated by the zoom magnification calculating unit 230. The zoom driving controller 240 can output the zoom driving control signal to the lens driving unit 111 shown in FIG. 1. In this regard, the zoom driving controller 240 can output a zoom control signal for driving a zoom lens to a telephoto end when the zoom magnification calculated by the zoom magnification calculating unit 230 is an enlargement magnification. Also, the zoom driving controller 240 can output a zoom control signal for driving a zoom lens to a wide-angle end when the zoom magnification calculated by the zoom magnification calculating unit 230 is a downsize magnification.

FIGS. 10 to 13 are views for describing a zoom control method according to other embodiments.

Figure 10A:
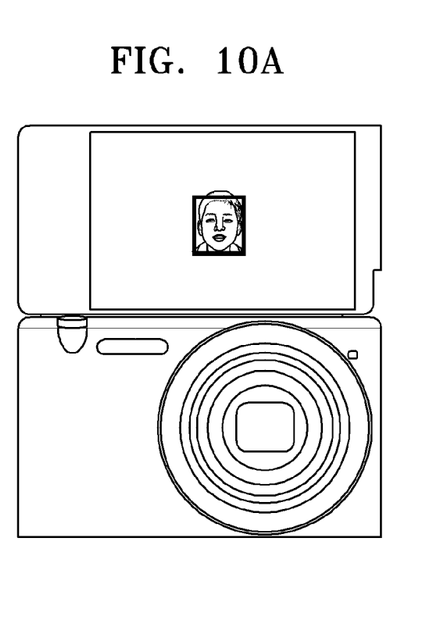
Figure 10B:
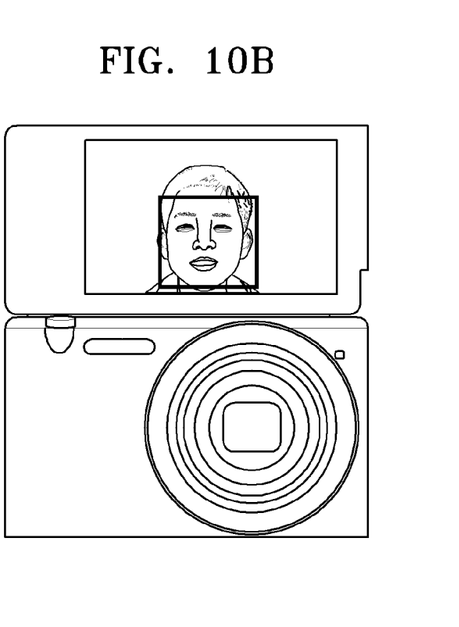

Referring to FIGS. 10A and 10B, when a face of a subject to be photographed is positioned in the middle of a screen, an image which is enlarged to a proper face size at a zoom magnification at which the face does not disappear from the screen can be displayed. In particular, a digital camera according to an embodiment can be configured in a manner that a display screen disposed at a rear surface can be flipped upward to face a subject as shown in FIGS. 10A and 10B. Accordingly, the subject to be photographed may be checked as to where an enlarged face of the subject is positioned on a screen even after performing a zooming operation. In particular, in a case of self-photographing, a subject may perform photographing while checking a position of his/her subject's face.

Figure 11A:
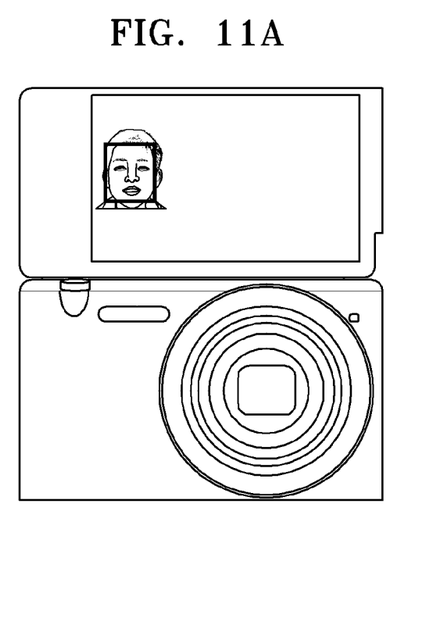
Figure 11B:
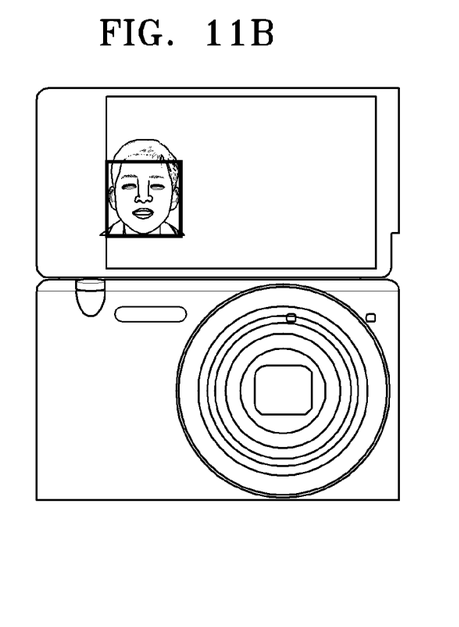

FIGS. 11A and 11B show a case where a face of a subject to be photographed is not positioned in the middle of a screen. In this case, even after performing a zooming operation or moving a zoom lens, a zoom driving may be performed while maintaining a proper face size and a zoom magnification at which the face does not disappear from the screen.

Figure 12A:
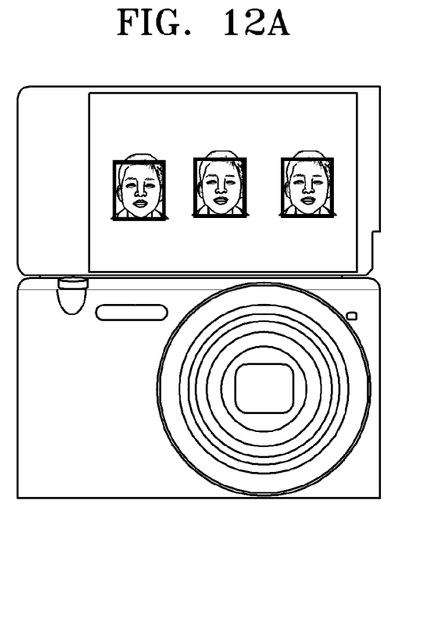
Figure 12B:
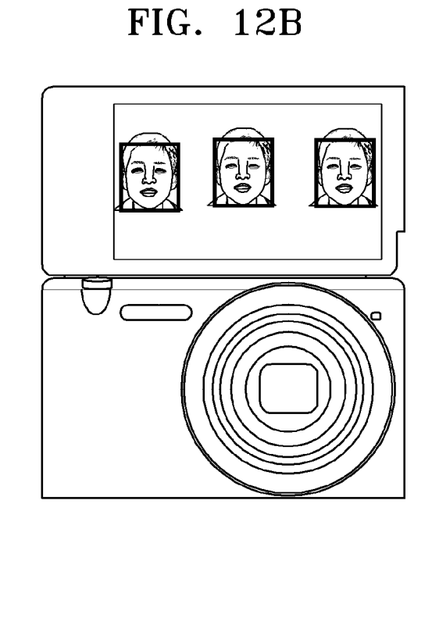

FIGS. 12A and 12B show a case where a plurality of faces can be photographed. In this case, a zoom driving may be performed so that face detecting frames of the respective faces do not disappear from a screen even after performing a zoom-in operation. Although it has been described with reference to FIGS. 11A to 12B that the digital camera of the present embodiment includes a flip-type display screen, embodiments are not limited thereto. That is, the display screen may be a front type display screen or a display screen that is disposed at a rear surface of a digital camera.

Figure 13:
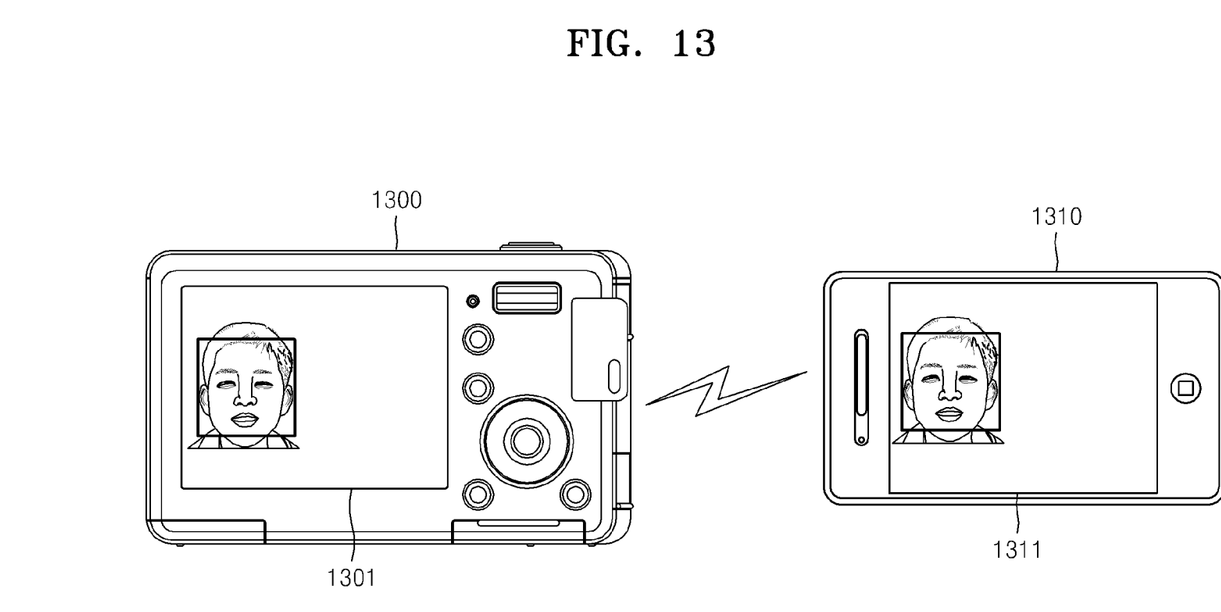
FIG. 13 is a view for describing a zoom control method according to another embodiment.

FIG. 13 shows a case where a display screen 1301 can be disposed at a rear surface of a digital camera 1300. An input image can be displayed on the display screen 1301, and a face of a subject in the input image can be enlarged a little. The input image can be transmitted to a mobile device 1310 via the communication unit 117 shown in FIG. 1 and can be displayed on a display screen 1311 of the mobile device 1301. Accordingly, a user may perform photographing while seeing the input image that is enlarged through a zoom-in operation and is displayed on the display screen 1311 of the mobile device 1310.

Figure 4:
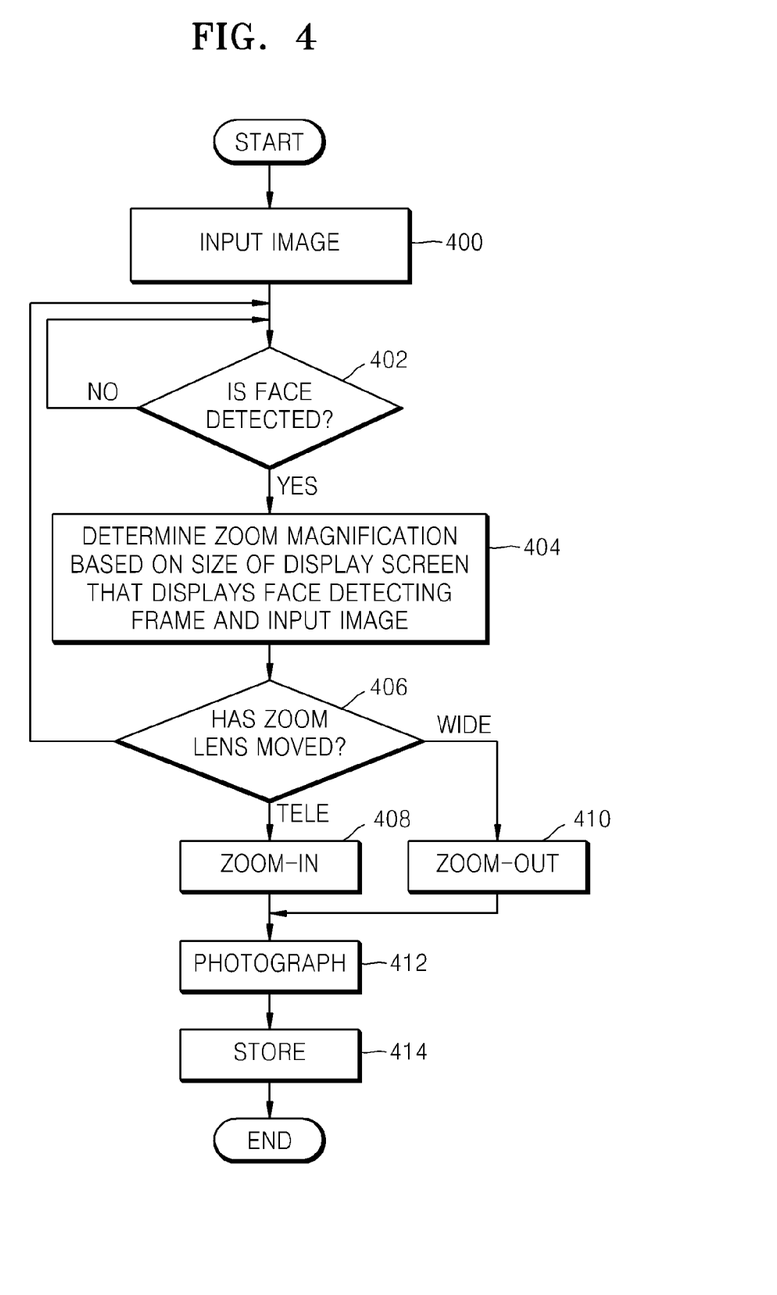
FIG. 4 is a flowchart showing a zoom control method, according to another embodiment.

FIG. 4 is a flowchart showing a zoom control method, according to another embodiment.

Referring to FIG. 4, an image can be inputted in operation 400, and a face can be detected from the input image in operation 402. Then, in operation 404, a zoom magnification can be determined based on a size of a display screen that displays a face detecting frame and the input image. In this regard, if the input image is enlarged through a zoom-in operation, a zoom magnification may be determined as a ratio of a size of the face detecting frame to a predetermined face size. Also, a maximum zoom magnification at which the face detecting frame does not overlap with at least one of the leftmost, rightmost, uppermost, and lowermost boundaries of an input image may be determined. In addition, a smaller zoom magnification of the determined two zoom magnifications may be selected, and any one of the zoom magnifications may be used. The description with regard to a case of a zoom magnification may also be applied to a case of a zoom reducing. For example, when a face detected from the input image is too large, that is, when the face detecting frame fully occupies the display screen, a zoom magnification at which the face can be reduced to a predetermined face size or a maximum zoom magnification at which the face detecting frame does not overlap with at least one of the leftmost, rightmost, uppermost, and lowermost boundaries of the input image may be determined. Accordingly, even when the face is reduced, a zoom-out operation may be automatically performed in such a way that the face is downsized to a proper face size and the face does not disappear from the display screen.

In operation 406, a zoom lens can be moved according to the zoom magnification determined in operation 404. When the zoom lens is moved to a tele end, an input image can be enlarged through a zoom-in operation in operation 408. When the zoom lens is moved to a wide-angle end, the input image can be downsized through a zoom-out operation in operation 410. The enlarged or reduced input image can be captured and stored in operations 412 and 414, respectively.

The apparatus described herein may comprise a processor, a memory for storing program data to be executed by the processor, a permanent storage such as a disk drive, a communications port for handling communications with external devices, and user interface devices, such as a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. This media can be read by the computer, stored in the memory, and executed by the processor. The computer readable recording media may also be distributed over network coupled computer systems so that the computer readable code is stored and executed in a distributed fashion. This media can be read by a computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Also, using the disclosure herein, programmers of ordinary skill in the art to which the invention pertains can easily implement functional programs, codes, and code segments for making and using the invention. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprises," "comprising," "includes," "including," "has," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Therefore, the scope of the invention is defined not by the detailed description of the invention but by the following claims, and all differences within the scope will be construed as being included in the invention. Numerous modifications and adaptations will be readily apparent to those of ordinary skill in this art without departing from the spirit and scope of the invention.

According to a zoom control method of the present invention, a subject may be photographed by automatically performing a zooming operation with a proper composition, and a problem where a subject disappears from a screen due to the zooming operation may be resolved.

Also, a subject on which a zooming operation has been performed before photographing may be displayed on a display screen.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A zoom control method comprising:
    displaying an input image on a display unit;
    displaying on the display unit a subject detecting frame that shows at least a part of a subject comprised in the input image; and
    performing a zooming operation on the input image according to a predetermined zoom magnification,
    wherein the subject detecting frame is not positioned in a middle of the input image, and a position of the subject detecting frame after performing the zooming operation is substantially the same as that of a prior position of the subject detecting frame before performing the zooming operation, wherein when a plurality of subject detecting frames exist, the zoom magnification is determined based on the plurality of subject detecting frames and the input image, and wherein the zoom magnification is determined in such a way that the plurality of subject detecting frames do not overlap with at least one of a left boundary, a right boundary, an upper boundary, and a lower boundary of the input image after performing the zooming operation.

2. The zoom control method of claim 1, wherein a ratio of a first distance between the subject detecting frame and a left boundary of the input image to a second distance between the subject detecting frame and a right boundary of the input image before the zooming operation is performed is substantially the same as that after the zooming operation is performed.

3. The zoom control method of claim 1, wherein a ratio of a first distance between the subject detecting frame and an upper boundary of the input image to a second distance between the subject detecting frame and a lower boundary of the input image before the zooming operation is performed is substantially the same as that after the zooming operation is performed.

4. The zoom control method of claim 1, wherein the zoom magnification is determined as a smaller zoom magnification from among a first zoom magnification at which the subject detecting frame does not overlap with at least one of a left boundary, a right boundary, an upper boundary, and a lower boundary of the input image after performing the zooming operation and a second zoom magnification that is determined based on a ratio at which the subject detecting frame occupies the input image.

5. The zoom control method of claim 1, wherein the display unit is configured to face the subject.

6. The zoom control method of claim 1, wherein the display unit is configured as a flip type display unit so as to face the subject.

7. The zoom control method of claim 1, further comprising transmitting the input image and the subject detecting frame to an external mobile device capable of displaying the input image and the subject detecting frame.

8. The zoom control method of claim 1, wherein the subject is a face, an animal, or an object.

9. A zoom control method comprising:
    detecting a subject from an input image;
    calculating a zoom magnification based on a detecting frame that detects the subject and a zoomable area of the input image; and
    performing a zooming operation according to the calculated zoom magnification,
    wherein the detecting frame is positioned within the zoomable area even after performing the zooming operation,
    wherein, when a plurality of subjects are detected from the input image, the calculating of the zoom magnification comprises calculating a coordinate of each detecting frame that detects each of the plurality of subjects at a zoom magnification at which a coordinate of at least one of a leftmost boundary, a rightmost boundary, an uppermost boundary, and a lowermost boundary of the zoomable area is enlarged, and
    wherein the zoom magnification is determined in such a way that the plurality of subject detecting frames do not overlap with at least one of the left boundary, the right boundary, the upper boundary, and the lower boundary of the input image after performing the zooming operation.

10. The zoom control method of claim 9, wherein a composition of the input image is maintained even after performing the zooming operation.

11. The zoom control method of claim 9, wherein the calculating of the zoom magnification comprises calculating the zoom magnification based on a ratio of a size of the detecting frame to a size of the zoomable area.

12. The zoom control method of claim 9, wherein the zoomable area is an entire area of a display screen for displaying the input image.

13. A zoom control apparatus comprising:
    a display unit that displays an input image and a subject detecting frame which shows at least a part of a subject included in the input image; and
    a controller that performs a zooming operation with respect to the input image according to a predetermined zoom magnification,
    wherein the subject detecting frame is not positioned in a middle of the input image, and a position of the subject detecting frame after performing the zooming operation is substantially the same as that of a prior position of the subject detecting frame before performing the zooming operation,
    wherein when a plurality of the subject detecting frames exist, the controller determines the zoom magnification based on the plurality of subject detecting frames and the input image, and
    wherein the controller determines the zoom magnification in such a way that the plurality of subject detecting frames do not overlap with at least one of a left boundary, a right boundary, an upper boundary, and a lower boundary of the input image after performing the zooming operation.

14. The zoom control apparatus of claim 13, wherein a ratio of a first distance between the subject detecting frame and a left boundary of the input image to a second distance between the subject detecting frame and a right boundary of the input image before the zooming operation is performed is substantially the same as that after the zooming operation is performed.

15. The zoom control apparatus of claim 13, wherein a ratio of a first distance between the subject detecting frame and an upper boundary of the input image to a second distance between the subject detecting frame and a lower boundary of the input image before the zooming operation is performed is substantially the same as that after the zooming operation is performed.

16. A digital photographing apparatus comprising:
    a photographing device that generates an input image by receiving light from a subject to be photographed;
    a zoom lens that enlarges or reduces the input image according to a predetermined zoom magnification;
    a display screen that displays the input image and a subject detecting frame which shows at least a part of the subject included in the input image; and
    a digital signal processor (DSP) that controls the zoom lens according to the zoom magnification,
    wherein the DSP controls the zoom lens in such a way that a position of the subject detecting frame before controlling the zoom lens is substantially the same as a prior position of the subject detecting frame after controlling the zoom lens,
    wherein when a plurality of subject detecting frames exist, the DSP determines the zoom magnification based on the plurality of subject detecting frames and the input image, and wherein the DSP determines the zoom magnification in such a way that the plurality of subject detecting frames do not overlap with at least one of a left boundary, a right boundary, an upper boundary, and a lower boundary of the input image after performing the zooming operation.

17. The digital photographing apparatus of claim 16, wherein the display screen is configured to face the subject.

18. The digital photographing apparatus of claim 16, wherein the display screen is a flip type display unit so as to face the subject.

19. The digital photographing apparatus of claim 16, further comprising a communication unit that transmits the input image and the subject detecting frame to an external mobile device configured to display the input image and the subject detecting frame.

* * * * *